(12) United States Patent
Hayashi

(10) Patent No.: US 11,240,394 B2
(45) Date of Patent: Feb. 1, 2022

(54) INFORMATION PROCESSING APPARATUS FOR INVALIDATING AN OPERATION SETTING FROM A SECOND DEVICE

(71) Applicant: FUJIFILM BUSINESS INNOVATION CORP., Tokyo (JP)

(72) Inventor: Koji Hayashi, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 385 days.

(21) Appl. No.: 16/032,393

(22) Filed: Jul. 11, 2018

(65) Prior Publication Data

US 2019/0037094 A1    Jan. 31, 2019

(30) Foreign Application Priority Data

Jul. 25, 2017 (JP) .............................. JP2017-143768

(51) Int. Cl.
   *H04N 1/00*    (2006.01)

(52) U.S. Cl.
   CPC ..... *H04N 1/00824* (2013.01); *H04N 1/00037* (2013.01); *H04N 1/00079* (2013.01); *H04N 1/00973* (2013.01)

(58) Field of Classification Search
   CPC ....................... H04N 1/00824; H04N 1/00973
   See application file for complete search history.

(56) References Cited

U.S. PATENT DOCUMENTS

| | | | | |
|---|---|---|---|---|
| 8,648,820 B2* | 2/2014 | Sensu | ................... | G06F 3/0227 345/173 |
| 2008/0084576 A1* | 4/2008 | Dantwala | ........... | H04N 1/00464 358/1.15 |
| 2010/0077055 A1* | 3/2010 | Cohen | ................. | H04L 67/1097 709/213 |
| 2015/0138582 A1* | 5/2015 | Ito | ...................... | H04N 1/00206 358/1.13 |
| 2015/0181069 A1* | 6/2015 | Tani | ................... | H04N 1/32662 358/1.14 |
| 2016/0054847 A1* | 2/2016 | Sugimoto | ................ | G09G 3/36 345/173 |
| 2016/0070510 A1* | 3/2016 | Iwase | .................... | G06F 3/1238 358/1.14 |
| 2016/0147426 A1* | 5/2016 | Urasawa | ............. | G06F 3/04842 715/771 |
| 2016/0286086 A1* | 9/2016 | Ohata | ................ | H04N 1/00896 |
| 2017/0134597 A1* | 5/2017 | Kubota | ............. | H04N 1/00477 |
| 2017/0264760 A1* | 9/2017 | Sato | .................... | H04N 1/00408 |
| 2017/0374211 A1* | 12/2017 | Saito | ...................... | G06F 3/1462 |
| 2018/0097949 A1* | 4/2018 | Mochizuki | ......... | H04N 1/00506 |
| 2018/0246452 A1* | 8/2018 | Akawa | .............. | G03G 15/5016 |
| 2018/0341841 A1* | 11/2018 | Tokumoto | .......... | G06K 15/4095 |
| 2018/0373466 A1* | 12/2018 | Takayama | ............. | G06F 3/1222 |

FOREIGN PATENT DOCUMENTS

JP    2011-118584 A    6/2011

* cited by examiner

*Primary Examiner* — Benjamin O Dulaney
(74) *Attorney, Agent, or Firm* — Oliff PLC

(57) ABSTRACT

An information processing apparatus includes a controller that performs control so that a specific operation among operations performed on a second operation unit is invalidated in a state where an operation performed on a first operation unit is valid.

11 Claims, 12 Drawing Sheets

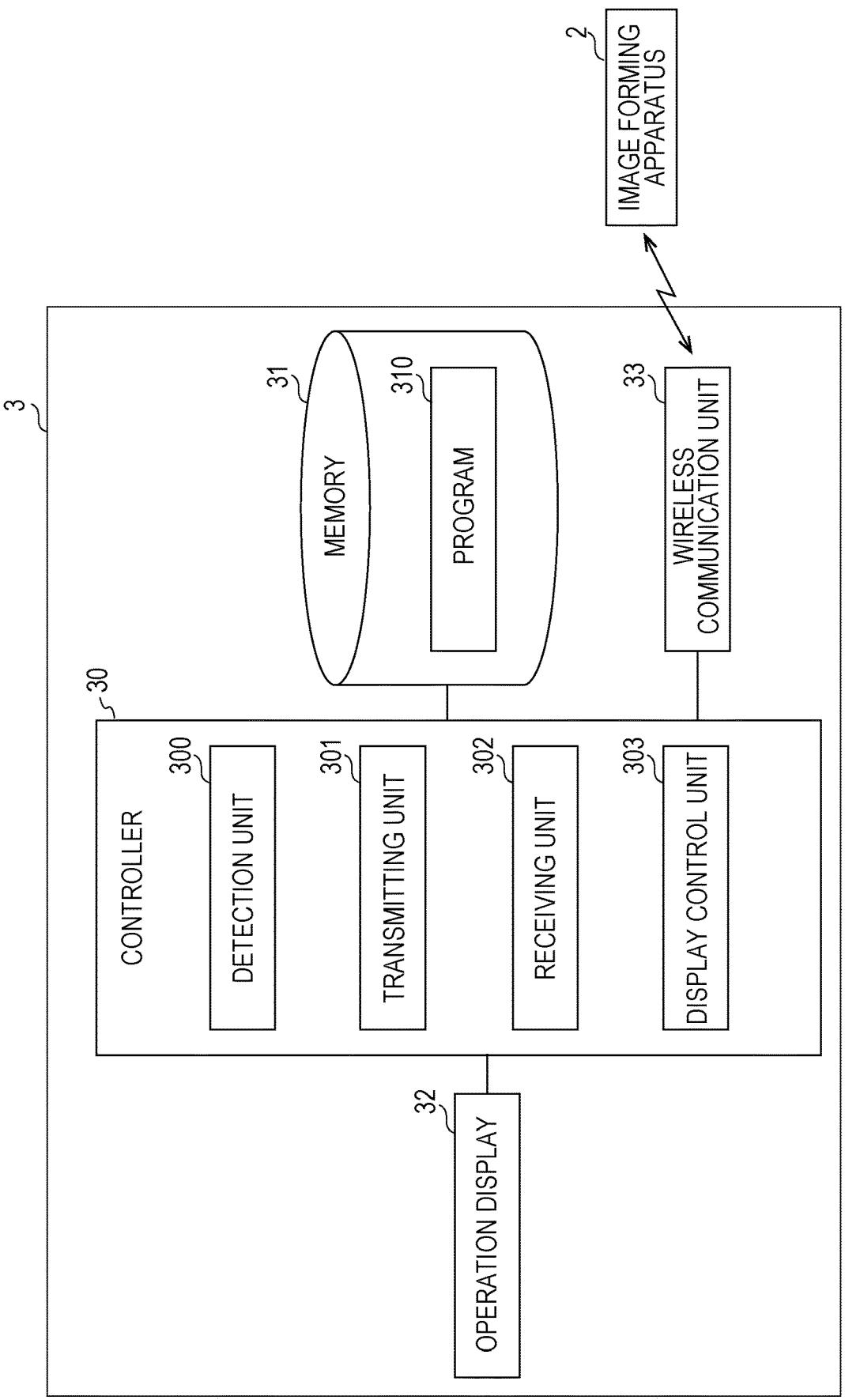

INFORMATION PROCESSING APPARATUS FOR INVALIDATING AN OPERATION SETTING FROM A SECOND DEVICE

CROSS-REFERENCE TO RELATED APPLICATIONS

This application is based on and claims priority under 35 USC 119 from Japanese Patent Application No. 2017-143768 filed Jul. 25, 2017.

BACKGROUND

Technical Field

The present invention relates to an information processing apparatus and a non-transitory computer readable medium.

SUMMARY

According to an aspect of the invention, there is provided an information processing apparatus including a controller that performs control so that a specific operation among operations performed on a second operation unit is invalidated in a state where an operation performed on a first operation unit is valid.

BRIEF DESCRIPTION OF THE DRAWINGS

Exemplary embodiments of the present invention will be described in detail based on the following figures, wherein:

FIG. 2B is a block diagram illustrating an example of a control system of a terminal apparatus;

DETAILED DESCRIPTION

Figure 1:
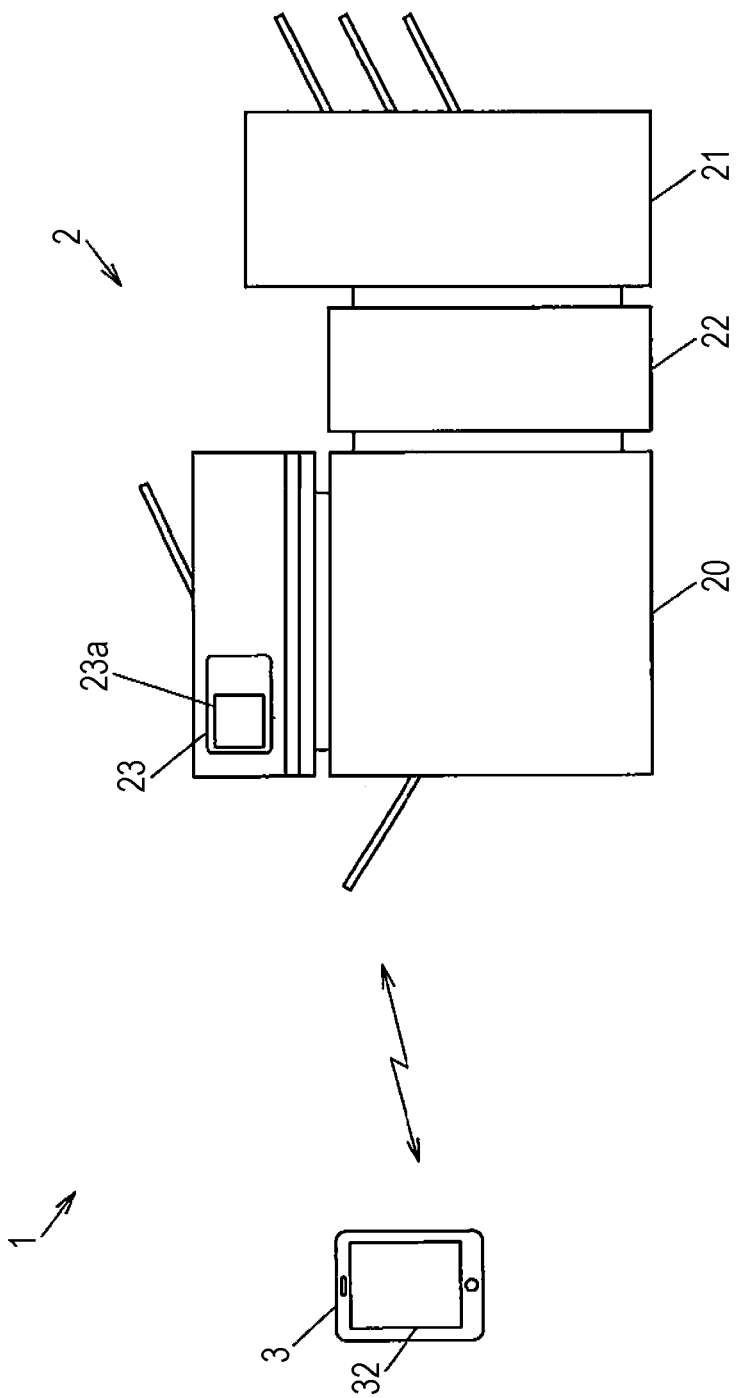
FIG. 1 schematically illustrates an example of a configuration of an image forming system according to the first exemplary embodiment of the present invention.

Exemplary embodiments of the present invention are described below with reference to the drawings. In the drawings, constituent elements that have substantially identical functions are given identical reference signs, and repeated description thereof is omitted.

SUMMARY OF EXEMPLARY EMBODIMENTS

An information processing apparatus according to the present embodiment includes a controller that performs control so that a specific operation among operations performed on a second operation unit is invalidated in a state where an operation performed on a first operation unit is valid.

The "state where an operation performed on the first operation unit is valid" is a state where an operation performed on the first operation unit is received. The expression "an operation performed on the second operation unit is invalidated" means that the operation performed on the second operation unit is not received.

The first operation unit and the second operation unit may have, for example, a subordinate-superior relationship. In a case where the first operation unit is a superior operation unit that receives a specific operation preferentially, the second operation unit serves as a subordinate operation unit. Examples of the subordinate operation unit include an operation display of a terminal apparatus and an operation unit, such as an external hardware keyboard, that can be added to the information processing apparatus. The expression "preferentially" means, for example, that an operation is not received by the subordinate operation unit while an operation is being received by the superior operation unit. Furthermore, the expression "preferentially" includes a case where a period in which it is assumed that the superior operation unit is in a state for receiving an operation even if an operation is not actually received by the superior operation unit is designated in advance, and an operation is not received by the subordinate operation unit within the designated period.

Examples of the specific operation include an operation of setting a setting value, an operation of selecting a specific option from among plural options, an operation of giving an instruction to execute a function, and an operation of switching a display form such as a character size or focus. These operations may be performed, for example, by using a specific key such as an operation button, a shift key, or a tab key or a combination of specific keys such as a shortcut key. A key is an example of an operator on which at least one of a character, a symbol, and a function is displayed.

First Exemplary Embodiment

FIG. 1 schematically illustrates an example of a configuration of an image forming system according to the first exemplary embodiment of the present invention. The image forming system 1 includes an image forming apparatus 2 and a terminal apparatus 3 that is wirelessly connected to the image forming apparatus 2. Communication between the image forming apparatus 2 and the terminal apparatus 3 is not limited to wireless communication and may be wired communication. The image forming apparatus 2 is an example of an information processing apparatus.

The image forming apparatus 2 is, for example, a multifunction printer having plural functions such as a scan function, a print function, a copy function, a facsimile function, and an e-mail function.

As illustrated in FIG. 1, the image forming apparatus 2 includes a body 20 that performs processes related to the aforementioned functions, a finishing unit 21 that performs post-processing such as punching and folding and discharges a sheet of paper, and a connecting unit 22 that connects the body 20 and the finishing unit 21. An operation unit 23 including an operation display 23a on which information is entered and displayed is provided on the body 20. The operation display 23a is an example of a first operation unit.

The terminal apparatus 3 can be, for example, a tablet-type terminal or a multi-function mobile phone (smartphone). The terminal apparatus 3 includes an operation display 32 on which information is entered and displayed. The operation display 32 of the terminal apparatus 3 is an example of a second operation unit.

The operation display 32 of the terminal apparatus 3 is, for example, a touch panel display and is configured such that a touch panel is superimposed on a liquid crystal display.

Configuration of Image Forming Apparatus

Figure 2A:
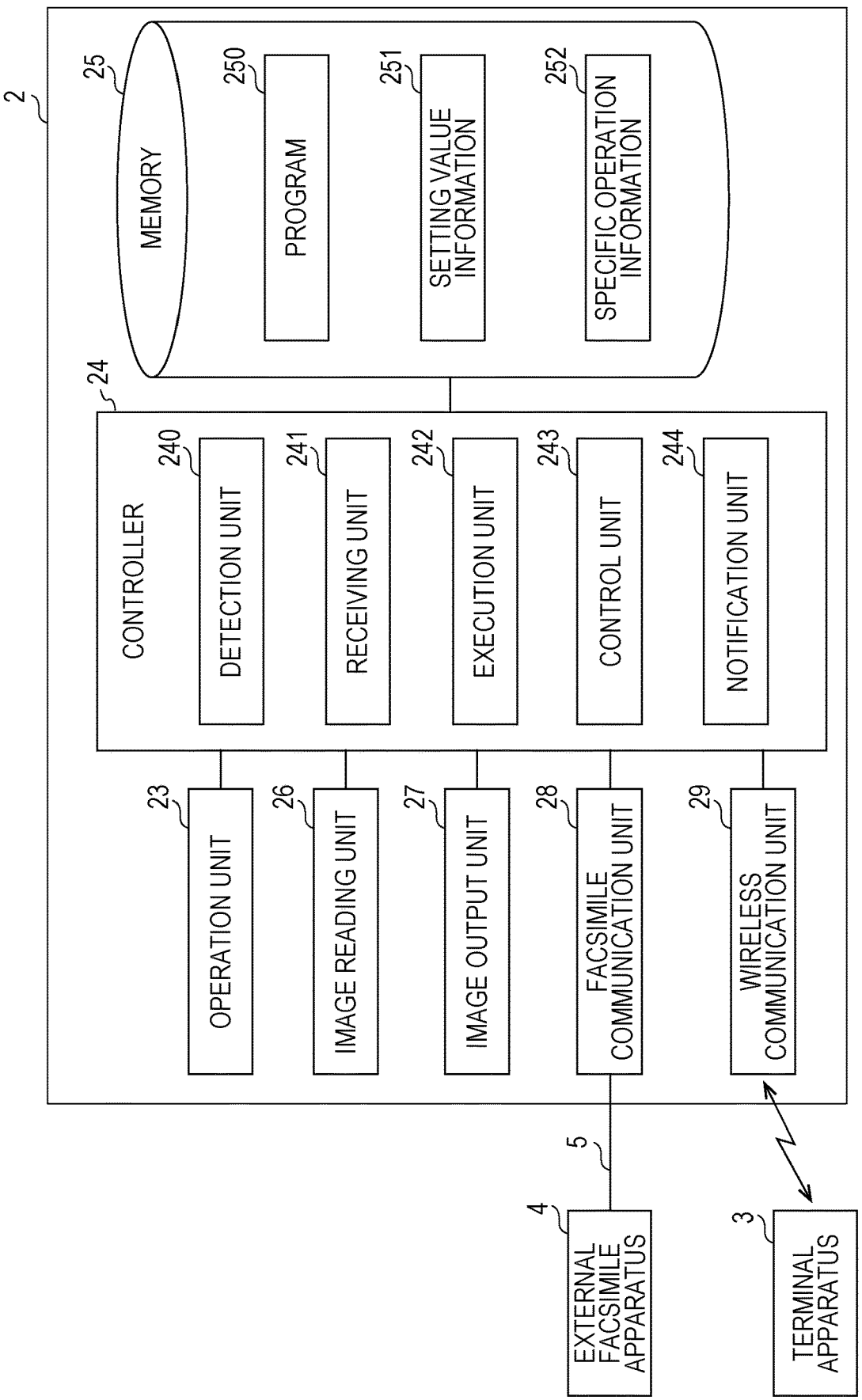
FIG. 2A is a block diagram illustrating an example of a control system of an image forming apparatus.

FIG. 2A is a block diagram illustrating an example of a control system of the image forming apparatus 2. The image forming apparatus 2 includes the operation unit 23, a controller 24 that controls each unit of the image forming apparatus 2, a memory 25 in which various kinds of data are stored, an image reading unit 26 that reads a document image from a document, an image output unit 27 that prints out an image, a facsimile communication unit 28 that transmits and receives faxes to and from an external facsimile apparatus 4 over a public network 5, and a wireless communication unit 29 that wirelessly communicates with the terminal apparatus 3.

The operation display 23a is, for example, a touch panel display and is configured such that a touch panel is superimposed on a display such as a liquid crystal display. The operation display 23a may be configured so that a display part and an input part are separately provided.

The image reading unit 26 includes a scanner and optically reads a document image from a document placed on a document platen or from a document fed by an automatic document feeder provided on the document platen.

The image output unit 27 prints out a color image or a monochromatic image on a recording medium such as a sheet of paper according to an electrophotographic system or an inkjet system.

The facsimile communication unit 28 modulates or demodulates data in accordance with a facsimile protocol such as G3 or G4 and performs facsimile communication over a telephone line.

The wireless communication unit 29 transmits and receives a signal to and from a wireless communication unit 33 (see FIG. 2B) (described later) of the terminal apparatus 3, for example, by using Wi-Fi or Bluetooth (Registered Trademark).

The controller 24 is constituted by a central processing unit (CPU), an interface, and the like. The CPU operates in accordance with a program 250 stored in the memory 25 and thus functions as a detection unit 240, a receiving unit 241, an execution unit 242, a control unit 243, a notification unit 244, and the like. Details of these units 240 to 244 will be described later.

The memory 25 is constituted by a read only memory (ROM), a random access memory (RAM), a hard disk, and the like and stores therein various kinds of data such as the program 250, setting value information 251, and specific operation information 252. The setting value information 251 is information on values set as setting items of functions such as scanning, printing, copying, facsimile, and e-mail.

The specific operation information 252 is information on an operation that is invalidated in a case where the operation is performed on the operation display 32 of the terminal apparatus 3 in a state where an operation performed on the operation display 23a of the image forming apparatus 2 is valid.

Examples of the specific operation include:
(a) an operation of setting a setting value,
(b) an operation of selecting a specific option from among plural options, and
(c) an operation of giving an instruction to execute a function.

In a case where any of the operations (a) to (c) is performed on both of the operation display 23a of the image forming apparatus 2 and the operation display 32 of the terminal apparatus 3, there is a risk of occurrence of erroneous entry or malfunction. For example, in a case where destination information is entered on the operation display 32 of the terminal apparatus 3 while destination information is being entered as a setting value on the operation display 23a of the image forming apparatus 2, there is a risk of erroneous entry of a destination. Furthermore, in a case where an operation of giving an instruction to execute a function is performed on the operation display 32 of the terminal apparatus 3 while the operation display 23a of the image forming apparatus 2 is being operated, there is a risk of malfunction.

In view of this, in a state where an operation performed on the operation display 23a of the image forming apparatus 2 is valid, the operations (a) to (c) on the operation display 32 of the terminal apparatus 3 are invalidated so that the operation display 23a of the image forming apparatus 2 receives an operation in preference to the operation display 32 of the terminal apparatus 3.

The operations (a) to (c) are operations that are also performed on the operation display 23a of the image forming apparatus 2 that serves as a first operation unit. Examples of an operation that can be performed on both the operation display 23a of the image forming apparatus 2 that serves as a first operation unit and the operation display 32 of the terminal apparatus 3 that serves as a second operation unit include an operation of entering a subject on the operation display 32 by using a keyboard of the terminal apparatus 3 and an operation of selecting a destination from among plural candidates by using the keyboard of the terminal apparatus 3 in a case where plural candidates for a destination can be displayed. A case where a screen showing contents identical to contents displayed on the operation display 23a of the image forming apparatus 2 is displayed on the operation display 32 of the terminal apparatus 3 (see FIG. 4) and an operation is performed on the displayed screen is also included in an operation performed on the first operation unit.

Operation Screen

Figure 3:
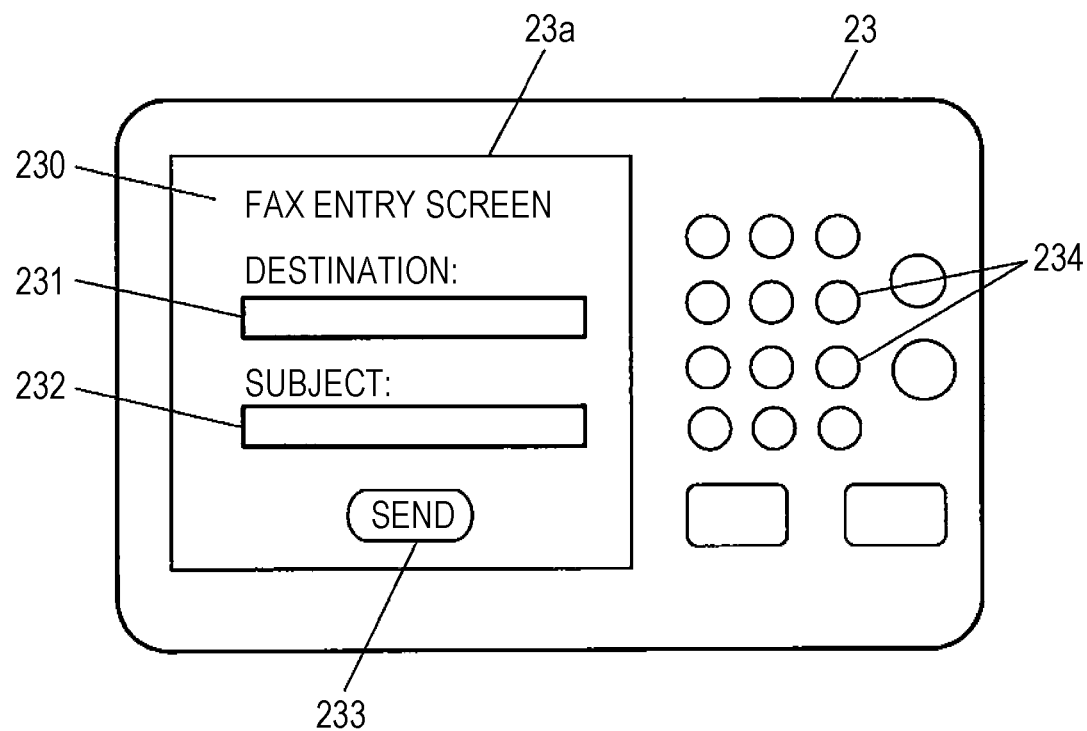
FIG. 3 illustrates an example of an operation screen displayed on an operation display of the image forming apparatus.
Figure 4:
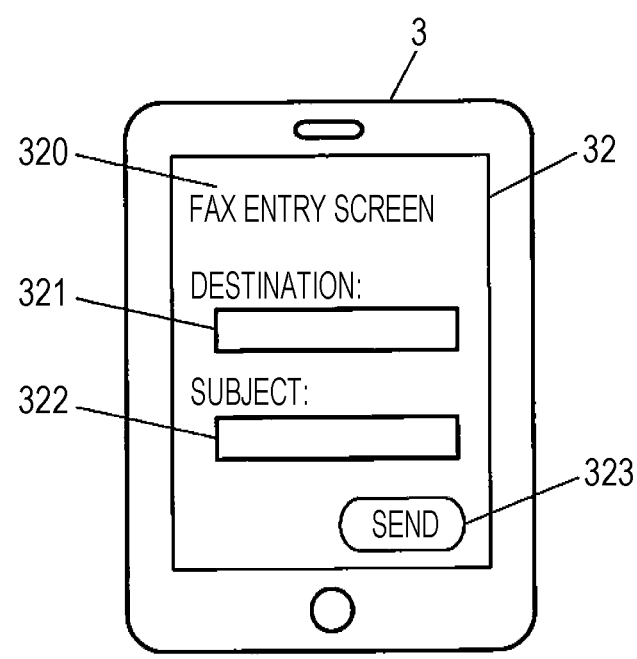
FIG. 4 illustrates an example of an operation screen displayed on an operation display of the terminal apparatus.

FIG. 3 illustrates an example of an operation screen displayed on the operation display 23a of the image forming apparatus 2, and FIG. 4 illustrates an example of an operation screen displayed on the operation display 32 of the terminal apparatus 3. The following discusses facsimile as an example.

As illustrated in FIG. 3, on the operation unit 23 of the image forming apparatus 2, display contents are displayed, and the operation display 23a that receives a user's operation and operation buttons 234 that are plural hardware keys are provided. Note that the operation buttons 234 may be software keys.

A FAX entry screen 230 that is an example of an operation screen is displayed on the operation display 23a. The FAX entry screen 230 includes, for example, a destination entry field 231 in which destination information indicative of a destination of a target is entered, a subject entry field 232 in which subject information is entered, and a transmission button 233 used to give an instruction to execute a facsimile function.

As illustrated in FIG. 4, a FAX entry screen 320 that is an operation screen including a destination entry field 321, a subject entry field 322 in which subject information is entered, and a transmission button 323 used to give an instruction to execute a facsimile function is displayed on the operation display 32 of the terminal apparatus 3.

Next, the units 240 to 244 of the image forming apparatus 2 are described. The detection unit 240 detects an operation, which is performed on the operation display 23a, for validating an operation performed on the operation display 23a. Examples of the operation for validating an operation performed on the operation display 23a include an operation of touching the operation display 23a and an operation of tapping the operation display 23a.

The receiving unit 241 starts receiving various user's operations on the operation screen displayed on the operation display 23a when the detection unit 240 detects an operation for validating an operation performed on the operation display 23a. In other words, a state in which an operation performed on the operation display 23a is valid starts when the detection unit 240 detects a recognition operation.

The various operations received by the receiving unit 241 include, for example, an operation of giving an instruction to execute a function such as scanning, printing, copying, or facsimile and an operation of setting values of setting items of these functions.

Furthermore, the receiving unit 241 receives a signal (hereinafter referred to as an "operation signal") corresponding to a button transmitted from the terminal apparatus 3. The operation signal transmitted from the terminal apparatus 3 is a signal indicative of a user's operation received by the terminal apparatus 3.

The execution unit 242 performs a process corresponding to an operation received by the receiving unit 241 and a process corresponding to an operation signal transmitted from the terminal apparatus 3.

The control unit 243 performs control so that an operation performed on the operation display 32 of the terminal apparatus 3 that will be described later is invalidated in a case where the operation is a specific operation recorded in the specific operation information 252, in a state where an operation performed on the operation display 23a is valid. Specifically, the control unit 243 controls the execution unit 242 not to perform a process based on the specific operation. Examples of the "state where an operation performed on the operation display 23a is valid" include a period in which an operation is being received by the operation display 23a of the image forming apparatus 2 and a predetermined period after an operation performed on the operation display 23a of the image forming apparatus 2.

Furthermore, the control unit 243 performs control so that an operation performed on the operation display 32 of the terminal apparatus 3 is validated after elapse of a predetermined period from an operation performed on the operation display 23a of the image forming apparatus 2.

The control unit 243 performs control so that a specific operation performed on the operation display 32 of the terminal apparatus 3 is invalidated after the operation display 32 of the terminal apparatus 3 is wirelessly connected to the image forming apparatus 2.

The notification unit 244 notifies a user about invalidation of an operation performed on the operation display 32 of the terminal apparatus 3 in a case where an operation performed on the operation display 32 of the terminal apparatus 3 is invalidated under control of the control unit 243. For example, the notification unit 244 may deliver a message or a voice signal indicating that an operation performed on the operation display 32 of the terminal apparatus 3 has been invalidated to the terminal apparatus 3.

Configuration of Terminal Apparatus

FIG. 2B is a block diagram illustrating an example of a control system of the terminal apparatus 3. As illustrated in FIG. 2B, the terminal apparatus 3 includes a controller 30 that controls the terminal apparatus 3, a memory 31 in which various kinds of data are stored, the operation display 32 on which information is entered and displayed, and a wireless communication unit 33 for wireless communication with the image forming apparatus 2.

The wireless communication unit 33 transmits and receives a signal to and from the wireless communication unit 29 of the image forming apparatus 2, for example, by using Wi-Fi or Bluetooth (Registered Trademark).

The controller 30 of the terminal apparatus 3 is constituted by a central processing unit (CPU), an interface, and the like. The controller 30 operates in accordance with a program 310 stored in the memory 31 of the terminal apparatus 3 and functions as a detection unit 300, a transmitting unit 301, a receiving unit 302, a display control unit 303, and the like. Details of the units 300 to 303 will be described later.

The memory 31 of the terminal apparatus 3 is constituted by a read only memory (ROM), a random access memory (RAM), a hard disk, and the like and stores therein various kinds of data such as the program 310.

The detection unit 300 detects various kinds of operations performed on the operation display 32 of the terminal apparatus 3 by a user.

The transmitting unit 301 generates an operation signal corresponding to an operation received by the detection unit 300 of the terminal apparatus 3 and causes the wireless communication unit 33 to transmit the operation signal to the image forming apparatus 2.

The receiving unit 302 causes the wireless communication unit 33 to receive various kinds of information transmitted from the image forming apparatus 2. The information transmitted from the image forming apparatus 2 includes, for example, information on display contents.

The display control unit 303 performs control so that display contents are displayed on the operation display 32 of the terminal apparatus 3 in accordance with information received by the receiving unit 302 of the terminal apparatus 3.

Figure 5:
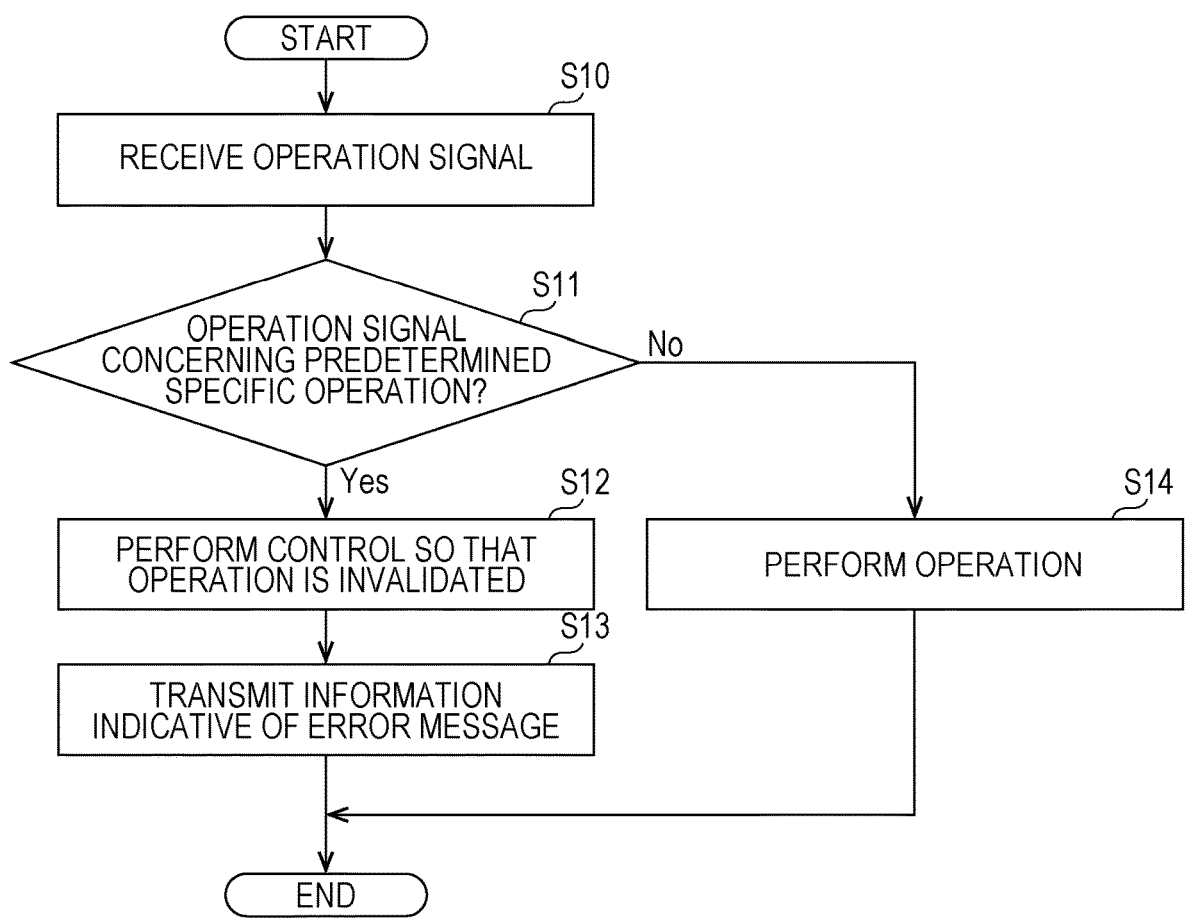
FIG. 5 is a flowchart illustrating an example of how the image forming apparatus according to the first exemplary embodiment of the present invention operates.

Operation of First Exemplary Embodiment (1) Operation of Image Forming Apparatus FIG. 5 is a flowchart illustrating an example of how the image forming apparatus 2 according to the first exemplary embodiment of the present invention operates.

The receiving unit 241 of the image forming apparatus 2 receives an operation signal transmitted from the terminal apparatus 3 (S10).

Next, the control unit 243 determines whether or not the operation signal received by the receiving unit 241 is an operation signal concerning a specific operation (S11).

In a case where the operation signal received by the receiving unit 241 is an operation signal concerning a specific operation recorded in the specific operation information 252 (Yes in S11), the control unit 243 performs control so that an operation corresponding to the operation signal is invalidated (S12).

Next, the notification unit 244 transmits information indicative of an error message indicating that the operation performed on the terminal apparatus 3 has been invalidated to the terminal apparatus 3 (S13).

In a case where the operation signal received by the receiving unit 241 is not an operation signal concerning a specific operation recorded in the specific operation information 252 (No in S11), the execution unit 242 performs an operation corresponding to the operation signal (S14).

(2) Operation of Terminal Apparatus

Figure 6:
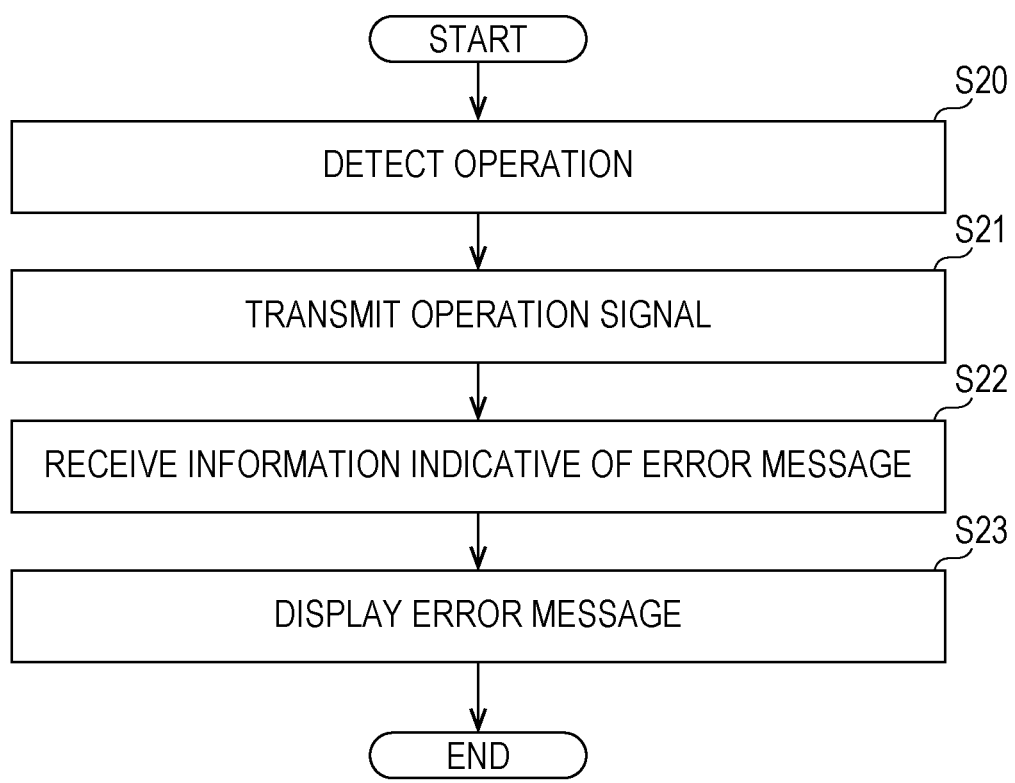
FIG. 6 is a flowchart illustrating an example of how the terminal apparatus according to the first exemplary embodiment of the present invention operates.

FIG. 6 is a flowchart illustrating an example of how the terminal apparatus 3 according to the first exemplary embodiment of the present invention operates. The detection unit 300 of the terminal apparatus 3 detects an operation performed on the operation display 32 of the terminal apparatus 3 by a user (S20).

Next, the transmitting unit 301 generates an operation signal corresponding to the operation received by the detection unit 300 and causes the wireless communication unit 33 to transmit the operation signal to the image forming apparatus 2 (S21).

The receiving unit 302 of the terminal apparatus 3 receives information indicative of an error message transmitted by the notification unit 244 (S22).

The display control unit 303 performs control so that the error message is displayed on the operation display 32 of the terminal apparatus 3 on the basis of the information received by the receiving unit 302 of the terminal apparatus 3 (S23).

It is thus possible to suppress occurrence of malfunction based on an unintended operation performed on the terminal apparatus 3 that remotely operates the image forming apparatus 2 while an operation is being performed on the operation display 23a of the image forming apparatus 2.

Modification

In the above exemplary embodiment, the control unit 243 controls the execution unit 242 not to perform an operation corresponding to an operation signal. However, the present disclosure is not limited to this. For example, the control unit 243 may control the receiving unit 241 of the image forming apparatus 2 not to receive an operation signal concerning a specific operation.

In the above exemplary embodiment, the control unit 243 is provided in the controller 24 of the image forming apparatus 2. However, the present disclosure is not limited to this configuration. It is also possible to employ a configuration in which a control unit is provided in the controller 30 of the terminal apparatus 3 and the controller 30 of the terminal apparatus 3 controls the transmitting unit 301 not to transmit an operation signal concerning a specific operation to the image forming apparatus 2.

Second Exemplary Embodiment

Figure 7:
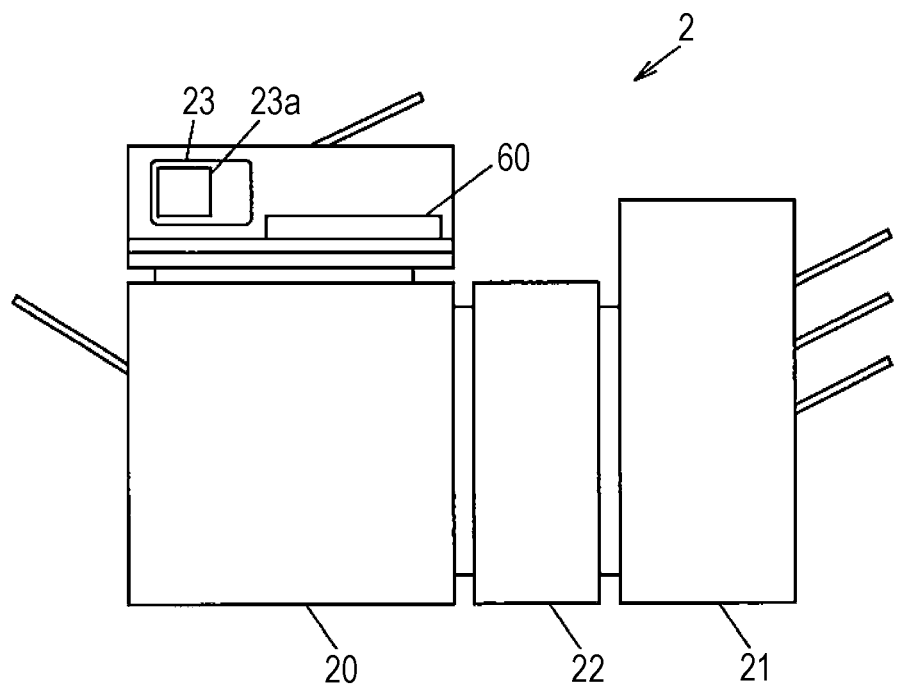
FIG. 7 schematically illustrates an example of a configuration of an image forming apparatus according to the second exemplary embodiment of the present invention.
Figure 8:
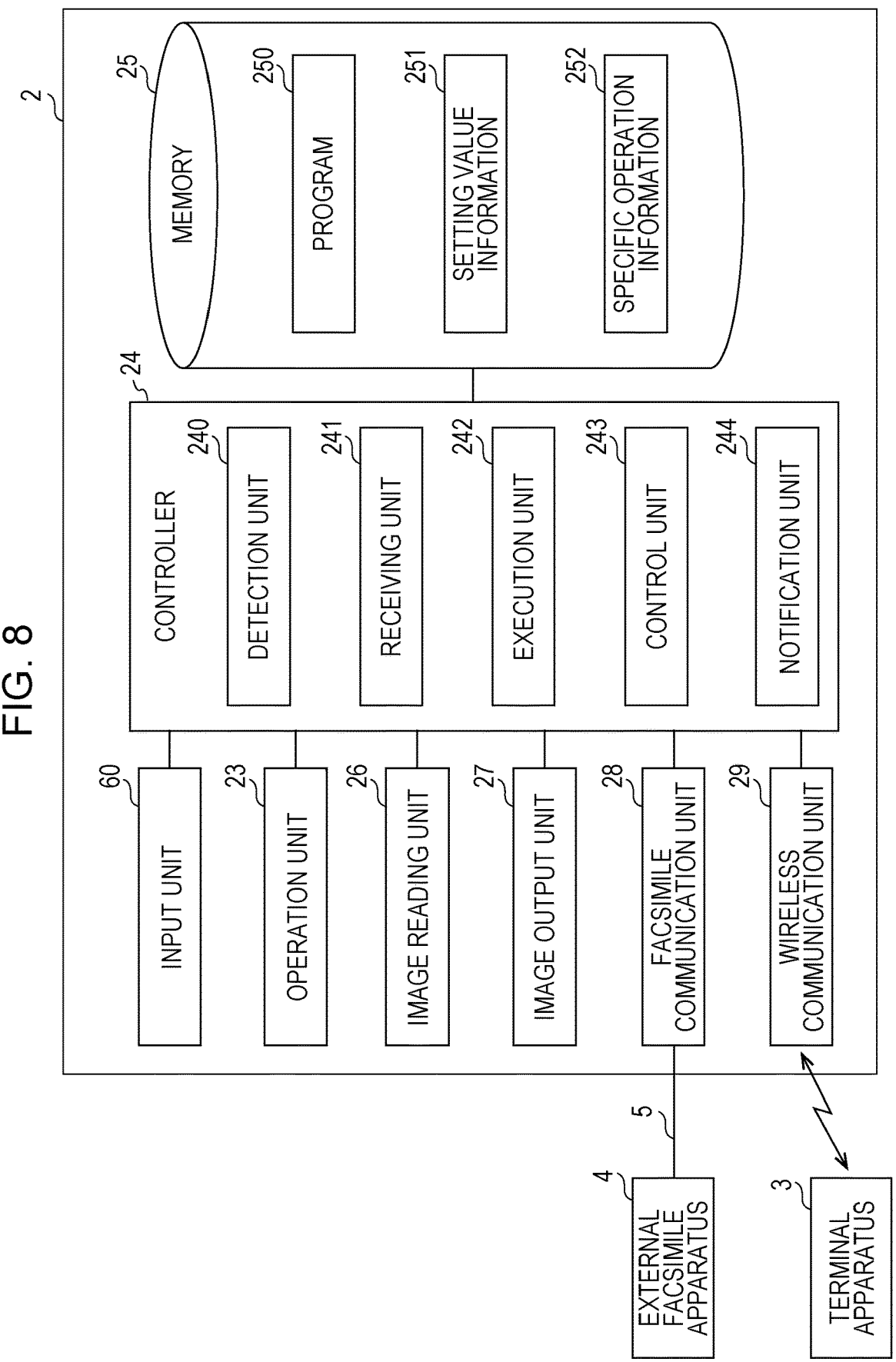
FIG. 8 is a block diagram illustrating an example of a control system of the image forming apparatus according to the second exemplary embodiment of the present invention.

FIG. 7 schematically illustrates an example of a configuration of an image forming apparatus 2 according to the second exemplary embodiment of the present invention. FIG. 8 is a block diagram illustrating an example of a control system of the image forming apparatus 2 according to the second exemplary embodiment of the present invention.

In the first exemplary embodiment, the control unit 243 has a function of performing control so that a specific operation performed on the operation display 32 of the terminal apparatus 3 is invalidated. Meanwhile, in the second exemplary embodiment, a control unit 243 has a function of performing control so that only a specific operation performed on an operation display 32 of a terminal apparatus 3 is validated. The following basically describes differences from the first exemplary embodiment.

As illustrated in FIGS. 7 and 8, the image forming apparatus 2 further includes an input unit 60 used to enter information into the image forming apparatus 2 in addition to the configuration described in the first exemplary embodiment. The input unit 60 is an example of a second operation unit. The terminal apparatus 3 of the first exemplary embodiment may be used as the second operation unit of the second exemplary embodiment.

The input unit 60 is, for example, an external physical keyboard (hardware keyboard) connected to the image forming apparatus 2 by using a universal serial bus (USB) cable or the like. The input unit 60 is not limited to a hardware keyboard and may be a keyboard (software keyboard) displayed on a display screen of an operation display 23a and may be a keyboard projected on a virtual space.

Specific operation information 252 includes a "specific operation" field. The "specific operation" field indicates an operation that is validated when performed on the operation display 32 of the terminal apparatus 3 that serves as the second operation unit.

Examples of the specific operation include:
(a) an operation using a shift key,
(b) an operation using a tab key,
(c) an operation using a shortcut key, and
(d) an operation using plural specific keys.

For example, an operation of switching a character displayed on the operation display 23a of the image forming apparatus 2 between a lower case and an upper case is associated with the operation using a shift key. For example, an operation of switching an entry field in which information is to be entered is associated with the operation using a tab key.

The operation using a shortcut key is, for example, operating a key other than a control key together with the control key. A specific operation is associated with the operation using a shortcut key. The operation using a shortcut key is an example of an operation in which a combination of two or more operators function as a single operator. The shortcut key is an example of a combination of two or more operators functioning as a single operator.

A specific operation is associated with the operation using plural keys. The operation using plural keys is an example of an operation using two or more operators. The plural keys may be, for example, plural keys that are adjacent to each other or may be, for example, plural keys that are located at separate positions.

Note that the operations (a) to (d) are operations that are also performed on the operation display 23a of the image forming apparatus 2 that serves as a first operation unit.

A detection unit 240 detects an operation performed on the input unit 60, i.e., an operation of a key (hereinafter referred to as a "key operation").

In a state where an operation performed on the operation display 23a of the image forming apparatus 2 is valid, the control unit 243 performs control so that the operation performed on the input unit 60 is validated in a case where the operation is a specific operation recorded in the specific operation information 252.

Furthermore, in a state where an operation performed on the operation display 23a of the image forming apparatus 2 is valid, the control unit 243 performs control so that the operation performed on the input unit 60 is invalidated in a case where the operation is an operation other than a specific operation recorded in the specific operation information 252.

The control unit 243 performs control so that a software keyboard is displayed on the operation display 23a in a state where an operation performed on the operation display 23a of the image forming apparatus 2 is valid.

In a case where a key operation is invalidated under control of the control unit 243, a notification unit 244 displays an error message indicating that a key operation has been invalidated on the operation display 23a of the image forming apparatus 2.

Operation of Second Exemplary Embodiment

Figure 9:
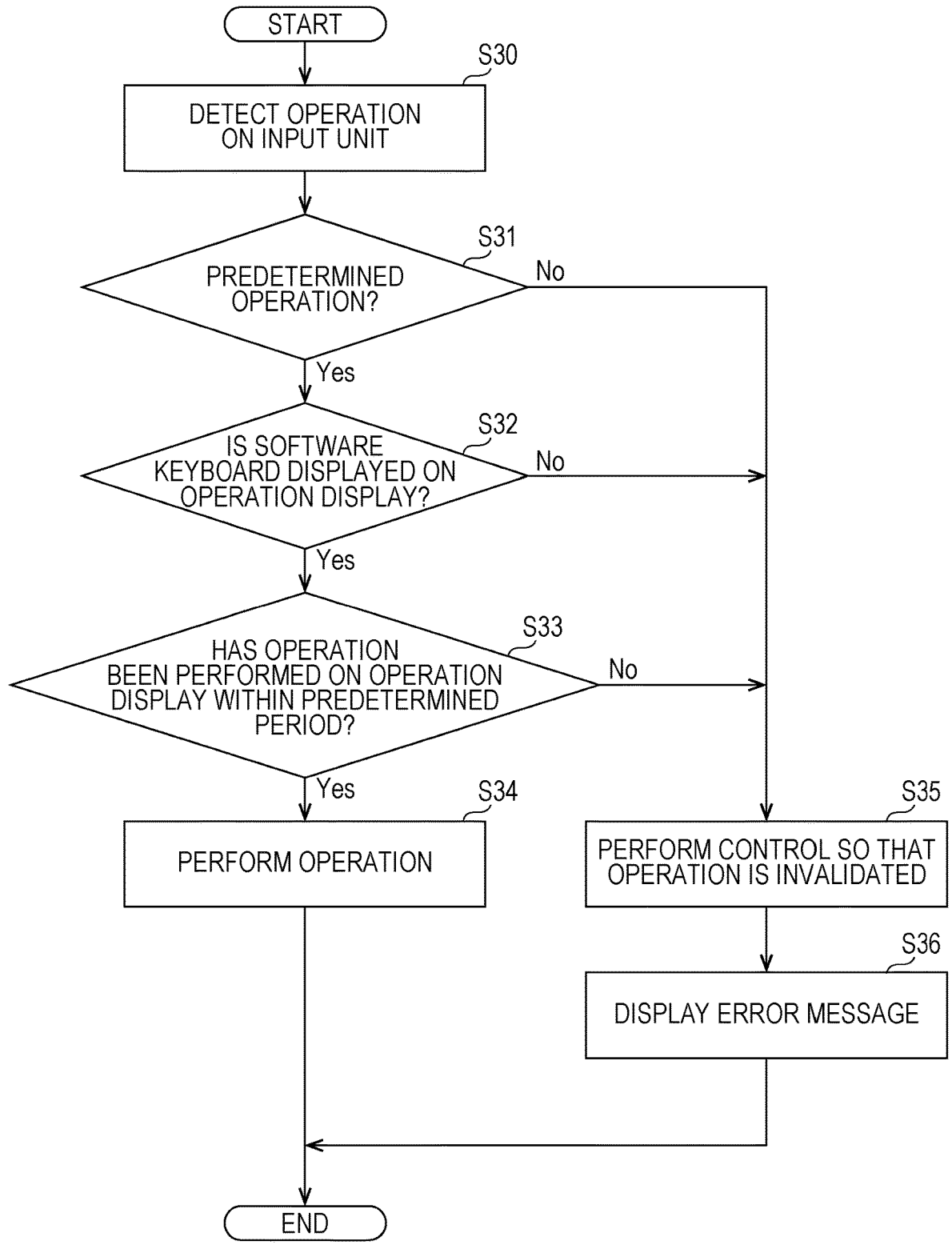
FIG. 9 is a flowchart illustrating an example of how the image forming apparatus according to the second exemplary embodiment of the present invention operates.

FIG. 9 is a flowchart illustrating an example of how the image forming apparatus 2 according to the second exemplary embodiment of the present invention operates.

The detection unit 240 detects a user's operation performed on the input unit 60, i.e., a key operation (S30).

The control unit 243 determines whether or not the operation detected by the detection unit 240 is a specific operation recorded in the specific operation information 252 (S31).

In a case where the operation detected by the detection unit 240 is a specific operation recorded in the specific operation information 252 (Yes in S31), the control unit 243 determines whether or not an operation performed on the operation display 23a of the image forming apparatus 2 is valid. Specifically, the detection unit 240 determines whether or not an operation performed on the operation display 23a of the image forming apparatus 2 is valid by determining whether or not a software keyboard is displayed on the operation display 23a (S32).

In a state where an operation performed on the operation display 23a of the image forming apparatus 2 is valid, i.e., in a case where a software keyboard is displayed on the operation display 23a (Yes in S32), a receiving unit 241 determines whether or not the key operation detected by the detection unit 240 is an operation performed within a predetermined period from a point in time at which the software keyboard is displayed on the operation display 23a (S33).

In a case where the key operation detected by the detection unit 240 is an operation performed within the predetermined period from the point in time at which the software keyboard is displayed on the operation display 23a (Yes in S33), the execution unit 242 performs a process corresponding to the specific operation (S34).

In a case where the operation detected by the detection unit 240 is not a specific operation recorded in the specific operation information 252 (No in S31), the control unit 243 performs control so that the operation is invalidated (S35).

The control unit 243 displays an error message indicating that the key operation has been invalidated on the operation display 23a of the image forming apparatus 2 (S36).

In a state where an operation performed on the operation display 23a of the image forming apparatus 2 is not valid, i.e., in a case where the software keyboard is not displayed on the operation display 23a (No in S32) and in a case where the key operation detected by the detection unit 240 is not an operation performed within the predetermined period from the point in time at which the software keyboard is displayed on the operation display 23a (No in S33), operations similar to those in Steps S35 and S36 are performed.

That is, the control unit 243 performs control so that the operation is invalidated (S35) and displays an error message indicating that the key operation has been invalidated on the operation display 23a of the image forming apparatus 2 (S36).

In this way, it is possible to suppress occurrence of malfunction based on an unintended operation using the input unit 60 such as a keyboard externally connected to the image forming apparatus 2. Furthermore, since control is performed so that an operation other than a specific operation is invalidated, it is possible to suppress occurrence of an erroneous operation or malfunction based on an unintended operation, for example, even in a case where the input unit 60 is provided in a place where a human arm or hand easily touches the input unit 60 or is provided in a place where an object such as paper is likely to be placed on the input unit 60.

Modification 1

In Step S33, the receiving unit 241 determines whether or not the key operation detected by the detection unit 240 is an operation performed within the predetermined period from the point in time at which the software keyboard is displayed on the operation display 23a. However, a point in time at which measurement of the predetermined period starts is not necessarily limited to the point in time at which the software keyboard is displayed on the operation display 23a. For example, the point in time at which measurement of the predetermined period starts may be a point in time at which a last operation performed on the operation display 23a is completed. Furthermore, the predetermined period may be a time-out period set in the image forming apparatus 2.

Modification 2

Figure 10A:
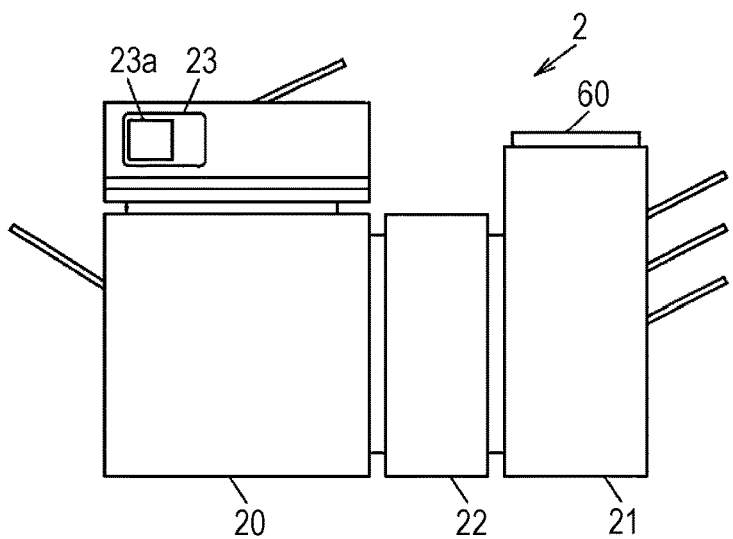
FIGS. 10A to 10C schematically illustrate an example of a configuration of an image forming apparatus according to a modification.

FIG. 10 schematically illustrates an example of a configuration of the image forming apparatus 2 according to a modification. The input unit 60 need not be provided close to the operation display 23a of the image forming apparatus 2, unlike the second exemplary embodiment. For example, as illustrated in FIG. 10A, the input unit 60 may be provided on an upper part of a finishing unit 21 that discharges a sheet of paper.

Figure 10B:
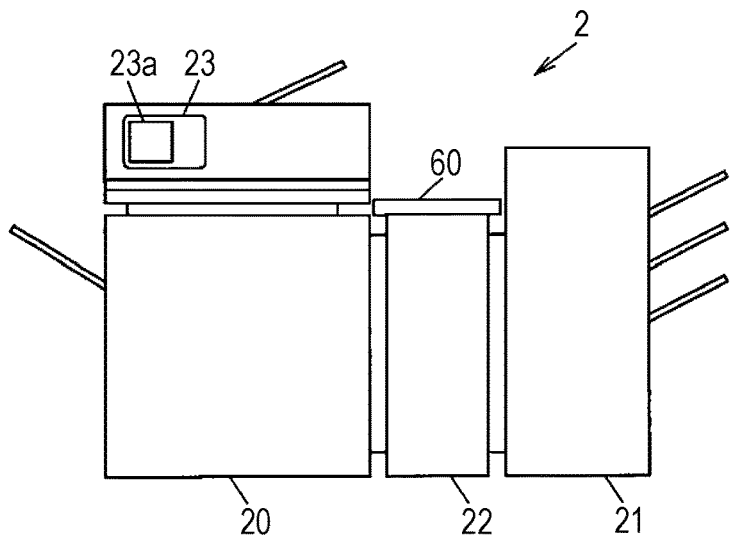

Alternatively, for example, as illustrated in FIG. 10B, the input unit 60 may be provided on an upper part of a connecting unit 22 provided between an image output unit 27 that prints out an image and the finishing unit 21 that discharges a sheet of paper.

Figure 10C:
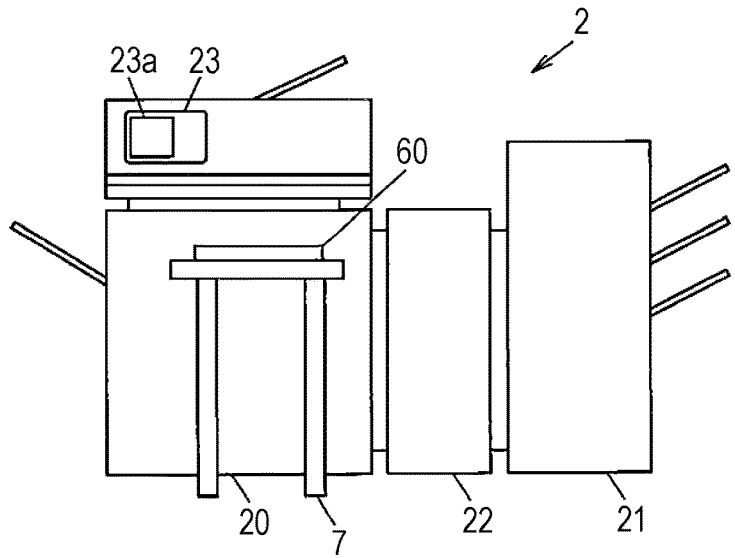

Alternatively, for example, as illustrated in FIG. 10C, the input unit 60 may be provided on a working table provided close to or away from the image forming apparatus 2.

As illustrated in FIGS. 10A through 10C, it is possible to suppress occurrence of malfunction even in a case where the input unit 60 is provided away from the operation display 23a of the image forming apparatus 2 and there is a risk of an erroneous operation such as a case where another operating person touches the input unit 60 without realizing.

Third Exemplary Embodiment

Figure 11:
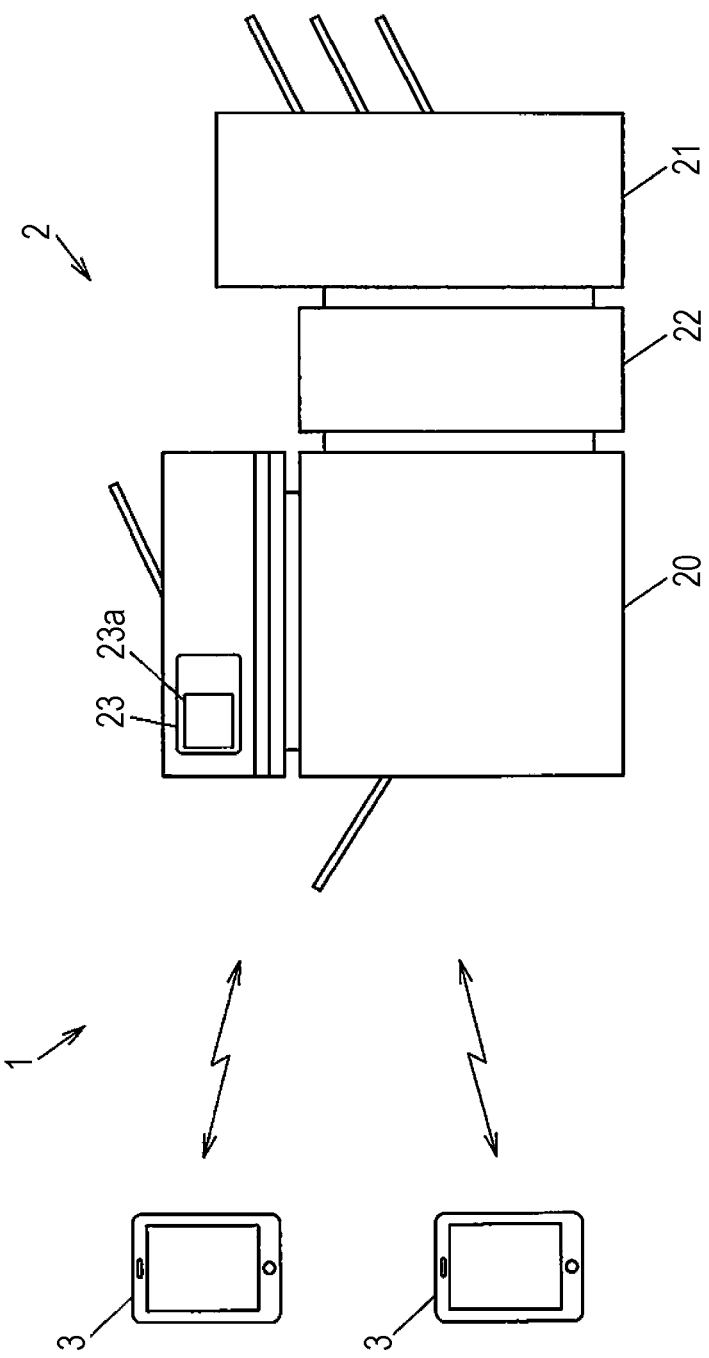
FIG. 11 schematically illustrates an example of a configuration of an image forming system according to the third exemplary embodiment of the present invention.

FIG. 11 schematically illustrates an example of a configuration of an image forming system 1 according to the third exemplary embodiment of the present invention. In the first exemplary embodiment, the image forming system 1 includes a single terminal apparatus 3. However, in the third exemplary embodiment, the image forming system 1 includes plural terminal apparatuses 3. The following basically describes differences from the first exemplary embodiment.

As illustrated in FIG. 11, the image forming system 1 may include an image forming apparatus 2 and plural terminal apparatuses 3 that are wirelessly connected to the image forming apparatus 2.

In this case, an operation display 23a of the image forming apparatus 2 may serve as a first operation unit, and operation displays 32 of the plural terminal apparatuses 3 may serve as second operation units. Alternatively, an operation display 32 of one of the plural terminal apparatuses 3 may serve as a first operation unit, and an operation display(s) 32 of the other one(s) of the plural terminal apparatuses 3 may serve as a second operation unit.

This makes it possible to suppress occurrence of an unintended erroneous operation performs on the other terminal apparatuses 3.

Fourth Exemplary Embodiment

Figure 12:
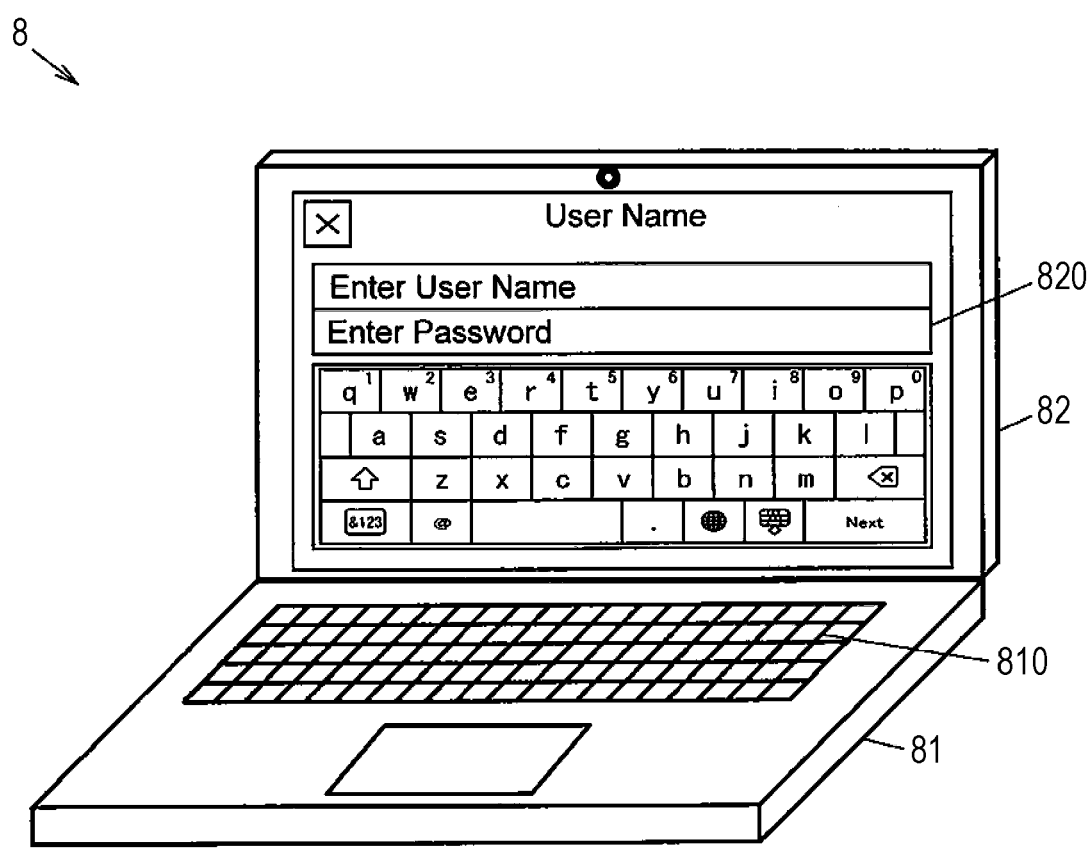
FIG. 12 illustrates an example of a configuration of a notebook personal computer according to the fourth exemplary embodiment of the present invention.

FIG. 12 illustrates an example of a configuration of a notebook personal computer according to the fourth exemplary embodiment of the present invention. In the first exemplary embodiment, an image forming apparatus has been described as an example of an information processing apparatus. However, in the fourth exemplary embodiment, a notebook personal computer 8 is described as an example of an information processing apparatus. The notebook personal computer 8 is an example of an information processing apparatus, but the information processing apparatus is not limited to a notebook personal computer. The following basically describes differences from the first exemplary embodiment.

As illustrated in FIG. 12, the notebook personal computer 8 includes an operation unit 81 and a display 82. The operation unit 81 has a hardware keyboard 810. The display 82 has an operation display 820. A software keyboard is displayed on the operation display 820.

In this case, the operation display 820 may serve as a first operation unit and the hardware keyboard 810 may serve as a second operation unit or vice versa, and switching may be performed by a switching operation.

In a case where the operation display 820 serves as a first operation unit and the hardware keyboard 810 serves as a second operation unit, it is possible to suppress occurrence of an unintended erroneous operation performed on the hardware keyboard 810. In a case where the hardware keyboard 810 serves as a first operation unit and the operation display 820 serves as a second operation unit, it is possible to suppress occurrence of an unintended erroneous operation performed on the software keyboard displayed on the operation display 820.

Although the exemplary embodiments of the present invention have been described above, the present invention is not limited to the above exemplary embodiments, and the above exemplary embodiments can be modified in various ways without departing from the spirit of the present invention. For example, although the input unit 60 of the image forming apparatus 2 serves as a second operation unit in the second exemplary embodiment, the input unit 60 may be added to the image forming apparatus 2 and serve as a second operation unit in the first exemplary embodiment.

Part of or all of each of the controllers 24 and 30 may be configured as a hardware circuit such as a field programmable gate array (FPGA) or an application specific integrated circuit (ASIC).

Furthermore, part of the constituent elements in the above exemplary embodiments may be omitted or changed without departing from the spirit of the present invention. Furthermore, addition, deletion, change, exchange, and the like of a step are possible in the flows in the above exemplary embodiments without departing from the spirit of the present invention. Furthermore, the programs used in the above exemplary embodiments may be recorded in a computer-readable recording medium such as a CD-ROM or may be stored in an external server such as a cloud server so as to be usable over a network.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing apparatus comprising a controller configured to:
   receive an operation signal of an operation from a second operation unit, the second operation unit being a mobile terminal apparatus;
   determine whether the operation signal concerns a predetermined specific operation, the predetermined specific operation being an operation that has been performed on a first operation unit and determined to be valid, the first operation unit being an operation display of an image forming apparatus, the image forming apparatus communicable with the mobile terminal apparatus; and
   invalidate the operation of the second operation unit when the operation signal is determined to concern the predetermined specific operation.

2. The information processing apparatus according to claim 1, further comprising an execution unit that performs processes corresponding to the operation performed on the first operation unit and an operation performed on the second operation unit,
   wherein in the state where the operation performed on the first operation unit is determined to be valid, the controller controls the execution unit not to perform a process corresponding to an operation performed on the second operation unit in a case where the operation is the predetermined specific operation.

3. The information processing apparatus according to claim 2, wherein
   the predetermined specific operation performed on the second operation unit includes the operation performed on the first operation unit.

4. The information processing apparatus according to claim 3, wherein
   the second operation unit is connectable to the information processing apparatus; and
   the controller performs control so that the operation performed on the second operation unit is invalidated when the operation signal is determined to concern the predetermined specific operation, after the second operation unit is connected to the information processing apparatus.

5. The information processing apparatus according to claim 2, wherein
the second operation unit is connectable to the information processing apparatus; and
the controller performs control so that the operation performed on the second operation unit is invalidated when the operation signal is determined to concern the predetermined specific operation, after the second operation unit is connected to the information processing apparatus.

6. The information processing apparatus according to claim 1, wherein
the predetermined specific operation performed on the second operation unit includes an operation performed on the first operation unit.

7. The information processing apparatus according to claim 6, wherein
the second operation unit is connectable to the information processing apparatus; and
the controller performs control so that the operation performed on the second operation unit is invalidated when the operation signal is determined to concern the predetermined specific operation, after the second operation unit is connected to the information processing apparatus.

8. The information processing apparatus according to claim 1, wherein
the second operation unit is connectable to the information processing apparatus; and
the controller performs control so that the operation performed on the second operation unit is invalidated when the operation signal is determined to concern the predetermined specific operation, after the second operation unit is connected to the information processing apparatus.

9. The information processing apparatus according to claim 1, wherein
the controller performs control so that a next operation performed on the second operation unit is invalidated in a case where the next operation is received by a receiving unit within a predetermined period from a point in time at which the operation is performed on the first operation unit.

10. The information processing apparatus according to claim 1, wherein
the controller performs control so that a next operation performed on the second operation unit is validated in a case where the next operation is received by a receiving unit after elapse of a predetermined period from a point in time at which the operation is performed on the first operation unit.

11. A non-transitory computer readable medium storing a program causing a computer to function as a controller configured to:
receive an operation signal of an operation from a second operation unit, the second operation unit being a mobile terminal apparatus;
determine whether the operation signal concerns a predetermined specific operation, the predetermined specific operation being an operation that has been performed on a first operation unit and determined to be valid, the first operation unit being an operation display of an image forming apparatus, the image forming apparatus communicable with the mobile terminal apparatus; and
invalidate the operation of the second operation unit when the operation signal is determined to concern the predetermined specific operation.

* * * * *